United States Patent Office 3,632,785
Patented Jan. 4, 1972

3,632,785
METHOD OF FORMING SHELL MOLDS
Leopold F. Bornstein, King of Prussia, Pa., assignor to Georgia Pacific Corporation, Portland, Oreg.
No Drawing. Filed Feb. 19, 1969, Ser. No. 800,772
Int. Cl. C08g 37/16
U.S. Cl. 260—25                                    4 Claims

ABSTRACT OF THE DISCLOSURE

Peelback in the formation of shell molds can be minimized by the inclusion in the resin of a water-soluble poly-flavonoid.

This invention relates to a method for forming shell molds from a particulate mixture of sand or other refractory material and thermosetting, bonding agents.

The shell molding process is well established in the foundry industry as a means for producing hollow cores, mold shells and molds of any kind that are characterized by thin and approximately equal wall thickness. In producing mold shells, the usual procedure is to apply an excess quantity of a molding mixture to the face of a preheated pattern (usually a metal pattern) which is mounted in a suitable pattern carrier. The mixture is held in contact with the pattern until the contacting portion thereof bonds and solidifies into a partially cured, shell-like layer. Typically, the shell has a substantially uniform thickness in the range of about ⅛ of an inch to ¼ of an inch. The thickness of the shell depends upon the time of contact of the mixture and the temperature of the pattern.

The molding mixture for forming the shell molds comprises sand and a bonding resin. The mixture is dumped or blown against a heated surface of a pattern or core box. The resin becomes softened by the heat and the shell or core becomes set forming a rigid core or shell. The core or shell thus formed is held in place for a few seconds to permit better pre-setting. The loose portion of the mixture, i.e., that wherein the resin has not reached plastic condition, is removed from the partially cured shell on the pattern. The shell then cures to a final, rigid state. Typically, a curing temperature in the range of about 400° F. to 900° F. is satisfactory. The shell can then be stripped from the pattern in a hard, rigid, strong condition.

The resins employed are generally phenol-formaldehyde novolaks (two-step resins) requiring the addition of hexamine (hexamethylene tetramine) to render the thermoplastic novolak thermosetting. The resin may be in the form of flake, powder, granule, lump or liquid. The liquid is usually an alcoholic (with or without water) solution of the resin at about 60% to 80% solids.

A very important step in the shell molding process is the mixing of the resin and the sand, usually called mulling. If a liquid resin is used, a suitable solution of hexamine is added to the sand in a mixer such as a muller, and the resin added thereto. Mulling is continued until the sand is dry and free flowing. Hot air may be introduced to remove alcohol and to insure that the same is dry. Generally, hot air is not added until the sand has been fairly well coated with the resin.

When flake, granule or lump resin is employed, the sand is heated to elevated temperature (for example, 300° F.) and the resin added to the heated sand. The resin melts and coats the sand. The sand temperature is then reduced, e.g. by the addition of a water-solution of hexamine. The sand-resin mixture is then dumped, crushed and screened, as in other techniques. In all of these methods, a number of additives may be incorporated in the mixture. Common additives include Vinsol, wax, iron-oxide, zircon sand, silica flour and, of course, hexamine, as mentioned previously. These materials can be added at a number of different stages in the process and commonly some of them are mixed together prior to addition. For example, a dry powdered mixture of hexamine and certain water-soluble poly-flavonoids (Rayonier HT–193) has been utilized commercially as the cross-linking agent for the thermoplastic novolak resin. Vinsol is a resinous extender characterized by an average molecular weight of 470, and acid number of 95, a methoxyl content of 5.3%, a saponification number of 165 and a density (25° C.) of 1.220. Lubricants such as metal stearates, e.g., calcium stearates are also added.

There are many advantages to the shell process. The shell molds can be made rapidly and economically. Very excellent and precise reproducion of the mold is obtained. Casting of thin sections is possible because of the smoothness and high permeability of the shell, and dimensions are reproduced accurately with unchilled surfaces.

One serious problem in the shell molding process is the problem of "peelback." "Peelback" results from a portion of the resin-mixture sand adhering to the pattern rather than to the shell being formed. Upon removal of the pattern, or of the shell from the pattern, the shell does not give the expected and desired precise reproduction during casting.

Many factors have been found to contribute to "peelback." One of the more important of these factors is the moisture content and moisture sensitivity of the coated sand and the type and amount of coating resin employed.

It has now been found that the addition of a small amount (for example, from 0.5% to 5%) of certain water-soluble materials, polyflavonoids, containing phenol or phenol homologue groups, capable of further reacting with aldehydes or other methylene sources to form water soluble resins which are very effective in controlling "peelback." While there are many materials belonging to this class of poly-flavonoids, they differ principally in the degree of polymerization. The principal requirements are that the poly-flavonoids be water-soluble and react with aldehyde donors such as formaldehyde and hexamine to give water-soluble condensation products. These materials typically are obtained as extracts from various wood species.

One such product is sold commercially as HT–115. This product, a mixture of flavonoid polymers differing only in the degree of polymerization, can be described as water-soluble condensation products of catechin and benzocyanidin. The structural unit found in the flavonoid polymers is substantially as follows:

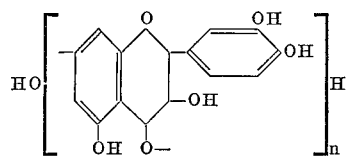

The precise value of n has not been determined. However, the composition is a black, water-soluble powder, and a 25% aqueous solution, at 25° C. and at a pH of 10.5, exhibits a viscosity of 150 cps. Solution up to 30% can be prepared readily. The composition has a phenolic hydroxyl content of 8.0%.

Another typical poly-flavonoid useful for the purpose of the present invention is HT–193. This product can be described as a water-soluble copolymer of catechin and leucocyanidin. The structural unit is essentially the same as illustrated previously. A 1% aqueous solution has a pH of 5.9. The material has a phenolic hydroxyl content of 8.0%.

The poly-flavonoid additive is introduced into the resin prior to the coating of the sand and prior to the addition of the other additives. This not only provides convenience and insures thoroughness of distribution of the additive through the resin, but also permits initial reaction between the additives and free or unreacted components in the system. This is particularly effective in the case of the solid resins in which the resin is subsequently utilized in the form of flakes or granules, etc. Upon formation of the initial resin, the necessary dosage of poly-flavonoid additive is introduced into the melt and dispersed or dissolved therein. Upon discharge of the resin, poly-flavonoid will be found dispersed or dissolved throughout the individual flakes and granules providing a substantially uniform, well-dispersed additive in a semi-reacted form. Similarly, where a liquid resin is employed, the poly-flavonoid additive is added directly to the solution of the finished resin and dispersed therein prior to the utilization of the resin.

Typical resins with which the present invention can be utilized can be described as liquid phenol-formaldehyde novolak resins for hot coating processes; liquid phenol-formaldehyde novolak resin solutions for cold or warm sand coating processes; and solid resins of the phenol-formaldehyde novolak type for hot coating shell processes. Typical procedures for producing such resins, while known to the art, are described below.

A liquid phenol-formaldehyde novolak resin for hot coating processes is prepared by charging a reactor with 28,880 lbs. of phenol, and 28 lbs. of sulphuric acid (26° Bé. diluted with 2 parts of water). Every 4 minutes, 300 lbs. of 44% formaldehyde solution are added until 3,900 lbs. have been added. During the formaldehyde addition, the temperature is kept at 210° to 220° F. The reactor contents are then cooled to 165° F. and 3,000 lbs. of formaldehyde added. The temperature is raised to 175° F. and kept for 12 minutes when an additional 2,000 lbs. of formaldehyde are added, in two parts, and the vessel contents cooled to 185° F. At this temperature, 6,970 lbs. of formaldehyde are introduced, the temperature is brought to 210° to 215° F., and distillation under vacuum is started. About 10,400 lbs. of water are distilled off. The formed resin is cooled to about 155° to 160° F. Once 3,300 lbs. of denatured ethyl alcohol or methanol are added, the resin is cooled to about 140° F., and discharged into drums or storage tanks. This resin has the following characteristics: Solid content of 70% to 76%, viscosity of 6,000 to 8,000 cps., specific gravity of 1.160 to 1.170 at 25° C.

A phenol-formaldehyde novolak resin solution for cold or warm sand coating processes is prepared by charging a reactor with 22,590 ls. of phenol, 40 lbs. of sulphuric acid (26° Bé. diluted with 2 parts of water) and 12,470 lbs. of 44% formaldehyde. The formaldehyde is added in 150 lbs. quantities every 4 minutes. The pressure in the reactor is maintained between 10 and 15 p.s.i. After completion of formaldehyde addition, distillation under atmospheric pressure is initiated. After distillation of about 11,400 lbs. of water, the temperature is lowered to 160° to 180° F., and 14,000 lbs. of denatured ethanol or methanol are added. The resin is then cooled to room temperature and discharged. The resin can be also modified with other thermoplastic resins such as Vinsol, which can be added to the above resin right after completion of distillation or after addition of alcohol. The amount of Vinsol will vary depending on the desired properties. A typical preparation would call for about 1,500 lbs. of Vinsol in the above formulation. This resin has the following typical properties: Solid content of about 60%, viscosity of 400 to 800 cps., specific gravity of 1.068 to 1.075.

A typical solid resin of the phenol-formaldehyde novolak type for hot coating shell processes can be produced from 25,700 lbs. of phenol, 14,800 lbs. of 44% formaldehyde, and 5.20 lbs. of 26° Bé. sulphuric acid diluted with 2 parts of water. The procedure of making the resin is almost identical with the first procedure described except that no alcohol is added and the distillation is carried out until a solid resin with a melting point of, for example, 190° to 210° F. results. The molten resin is then flaked on a flaker belt or flaker drum, or poured on a floor or tray for cooling and subsequent granulation. The granulated or flaked resin is either used as such or pulverized and used in the form of fine powder.

All resins produced or described above are thermoplastic and require the addition of 8–20% of hexamine for curing purposes. The poly-flavonoid additive is added to the finished resin before discharging in solution—or molten stage.

A typical formulation of a sand mix is as follows:

Sand—1000 lbs.
Resin (including poly-flavonoid)—1–4% on solid basis
Poly-flavonoid additive (in resin)—1–3% based on resin solids
Hexamine—15% based on resin solids
Lubricant such as metallic stearate—3–4% based on resin solids A typical processing machine is a muller. Cold or preheated sand, depending on the process used, is loaded into the muller. After a few minutes of mulling (wet mulling), hexamine dispersed in water is introduced and mulling continued with hot or warm air blowing for an additional few minutes. During this period the solvent evaporates, the resin pre-reacts with hexamine, and the sand becomes dry and free flowing (dry mulling). Lubricant is then added and, after a few seconds, coated sand discharged from the muller.

The coated sand is then pressed in shell molding machines to produce molds or shell for metal casting. A very significant reduction in peelback results as compared to mold made with essentially the same resin binder except free of the poly-flavonoid additive. As a result, the number of molds and/or castings rejected is significantly reduced with a corresponding increase in economy and efficiency of operation.

What is claimed is:

1. In a phenol-formaldehyde novolak resin adapted for use in shell molding processes, the improvement comprising from about 0.5% to 5% by weight of said resin of a water-soluble, normally solid poly-flavonoid, substantially uniformly dispersed through said resin, said poly-flavonoid being water-soluble condensation products of catechin and benzocyanidin or a water-soluble copolymer of catechin and leucocyanidin.

2. A resin in accordance with claim 1, containing from 1 to 3% of said poly-flavonoid.

3. In the process of preparing sand molds wherein sand is mulled with phenol-formaldehyde novolak resin and a cross-linking agent for said resin, the mulled mixture is formed to a pattern, and the formed, mulled mixture is cured to a rigid shell or core, the improvement comprising premixing with said resin while said resin is in liquid form from about 0.5% to 5% by weight of said resin of a water-soluble, normally solid poly-flavonoid, said poly-flavonoid being water-soluble condensation products of catechin and benzocyanidin or a water-soluble copolymer of catechin and leucocyanidin, whereby said resin contains said poly-flavonoid substantially uniformly dispersed therethrough during said mulling.

4. A process in accordance with claim 3, wherein the amount of said poly-flavonoid is from 1 to 3% by weight of said resin.

References Cited

UNITED STATES PATENTS

| | | | |
|---|---|---|---|
| 2,260,187 | 10/1941 | Miller | 260—25 |
| 2,792,386 | 5/1957 | Berger et al. | 260—210 |
| 2,834,741 | 5/1958 | Bleuenstein | 260—25 |
| 2,988,525 | 6/1961 | Clem | 260—25 |

HOSEA E. TAYLOR, Primary Examiner

W. E. PARKER, Assistant Examiner

U.S. Cl. X.R.

260—18, 38, 838; 264—123, 125